United States Patent [19]

Blew

[11] Patent Number: 4,939,896
[45] Date of Patent: Jul. 10, 1990

[54] METHOD AND APPARATUS FOR S-Z STRANDING

[75] Inventor: Douglas J. Blew, Hickory, N.C.

[73] Assignee: Siecor Corporation, Hickory, N.C.

[21] Appl. No.: 470,801

[22] Filed: Jan. 26, 1990

[51] Int. Cl.5 .......................... H01B 13/02; G02B 6/10
[52] U.S. Cl. .......................................... 57/293; 57/6; 57/9; 57/294
[58] Field of Search ...................... 57/293, 9, 294, 311, 57/352, 6, 7, 18

[56] References Cited

U.S. PATENT DOCUMENTS

| | | | |
|---|---|---|---|
| 4,359,857 | 11/1982 | Oestreich | 57/18 |
| 4,366,667 | 1/1983 | Oestreich | 57/293 X |
| 4,429,521 | 2/1984 | Oestreich | 57/294 |
| 4,434,610 | 3/1984 | Oestreich | 57/294 |
| 4,458,476 | 7/1984 | Mayr et al. | 57/294 |
| 4,586,327 | 5/1986 | Oestreich | 57/294 |

Primary Examiner—John Petrakes
Attorney, Agent, or Firm—Roy B. Moffitt

[57] ABSTRACT

A method and apparatus for increasing the line speed of an S-Z strander by applying a tensile force to the elongated accumulator of the strander, between 124 pounds and less than the elastic limit of the material from which the elongated accumulator is made, while the elongated accumulator is rotated in a reversing manner about its longitudinal axis and coated optical fibers and/or elongated tubes containing optical fibers are S-Z stranded thereabout.

7 Claims, 4 Drawing Sheets

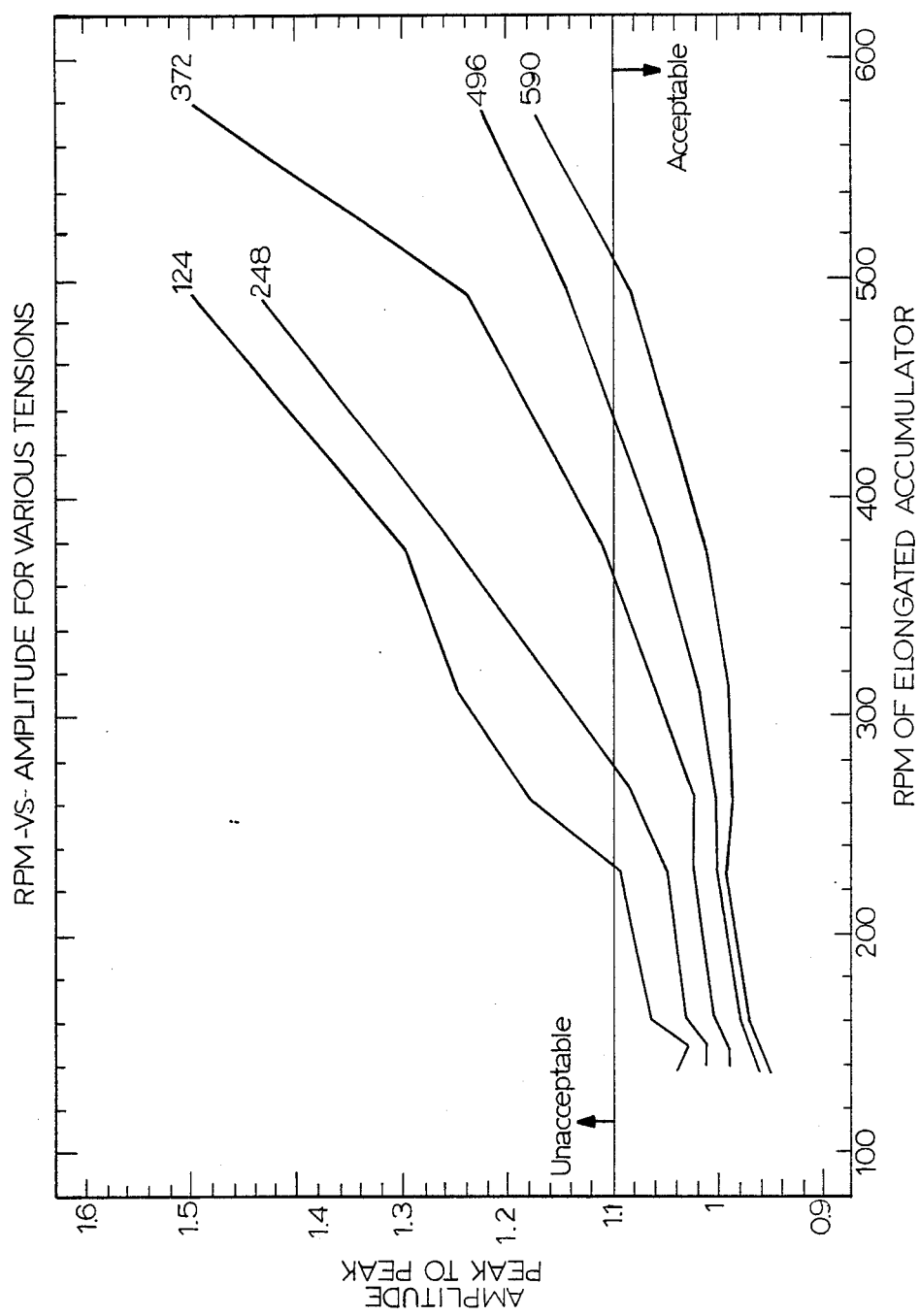

METHOD AND APPARATUS FOR S-Z STRANDING

BACKGROUND OF THE INVENTION

The invention is a high line speed S-Z stranding device for S-Z stranding one or more coated optical fibers and/or buffer tubes, in which optical fibers are disposed. Devices for S-Z stranding buffer tubes are well known and are exemplified by U.S. Pat. Nos. 4,429,521, which teaches a horizontal S-Z stranding device and 4,458,476, which discloses a vertical S-Z stranding device. The disclosures of both of the aforementioned patents are incorporated herein by reference.

Some S-Z stranding prior art disclosures use the term "tube store". A tube store is an elongated member about which coated optical fibers and/or buffer tubes containing optical fibers are S-Z stranded. Throughout this disclosure, such an elongated member is referred to as an "elongated accumulator". In most prior art S-Z stranding disclosures, there is taught methods and apparatus of disposing along the longitudinal axis of an elongated accumulator a plurality of tubes in which optical fibers are disposed and rotating the elongated accumulator in first one direction and then in another direction (a reversing manner), creating what is known in the art as an S-Z strand. The present invention carries out the same steps, but with an improvement that increases line speed.

Line speed is the length of time it takes an elongated buffer tube, as it is being S-Z stranded, to longitudinally travel from one end of an elongated accumulator to the other. The faster the line speed the higher the production and of course the faster the line speed, the faster the elongated accumulator must be rotated (in a reversing manner) in order to accommodate the increased line speed. It has been found that if no less than 124 pounds of tensile force is applied along longitudinal axis of the elongated accumulator as it is rotated, the faster it can be rotated thus achieving faster line speeds. The amplitude of vibration of the elongated accumulator, arising out of higher rotational speeds, is reduced to a tolerable level by such tensile forces.

BRIEF DESCRIPTION OF THE INVENTION

The invention is an S-Z stranding device containing a first and second spaced apart housings. In the first housing is a first plate having a center hole and in the second housing is a second plate having a center hole. An elongated accumulator having first and second terminal end portions and corresponding first and second free edges is employed, the first terminal edge portion received in the center hole of the first plate and the second terminal end portion received in the center hole of the second plate. A reversing means is engaged with the elongated accumulator for rotating it in a reversing fashion. The elongated accumulator is supplied with a first stop affixed between the first plate and the free edge of the first terminal portion of the elongated accumulator and a second stop affixed to the elongated accumulator between the second plate and the free edge of the second terminal end portions. The apparatus also has a device to place a tensile force of at least 124 pounds, but less than the elastic limit of the material from which the elongated accumulator is made, on the elongated accumulator.

The above-described device provides an apparatus that can be used to carry out the method steps of disposing a plurality of coated optical fibers and/or elongated tubes containing optical fibers on the elongated accumulator, periodically reverse rotating the elongated accumulator while simultaneously applying a tensile force of 124 pounds or more to the rotating elongated accumulator.

BRIEF DESCRIPTION OF THE DRAWINGS

FIG. 6 is a graph plotting amplitude (peak to peak) data of the elongated accumulator 21 of FIG. 1 against the RPM of the elongated accumulator while applying 124, 248, 372, 496 and 590 pounds of tensile force to the elongated accumulator 21 of FIGS. 1-5.

DETAILED DESCRIPTION OF THE INVENTION

Figure 1:
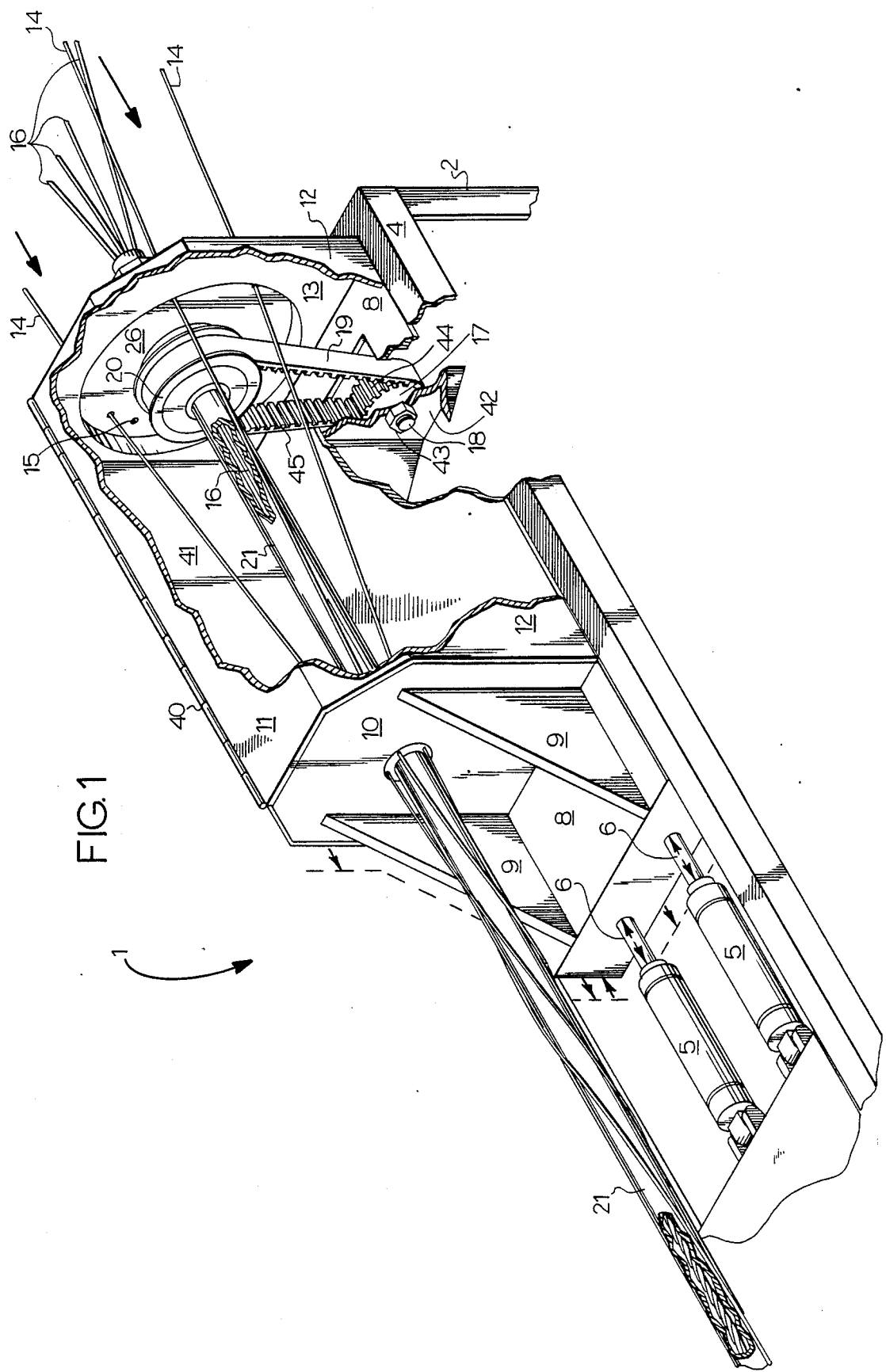
FIG. 1 is a perspective, partially cut away, partial view of the apparatus used to practice the S-Z stranding method of the invention, showing one terminal portion of an elongated accumulator, a reversing device engaged with the elongated accumulator and a device to place tension on the elongated accumulator while it is being rotated in a reversing manner.
Figure 4:
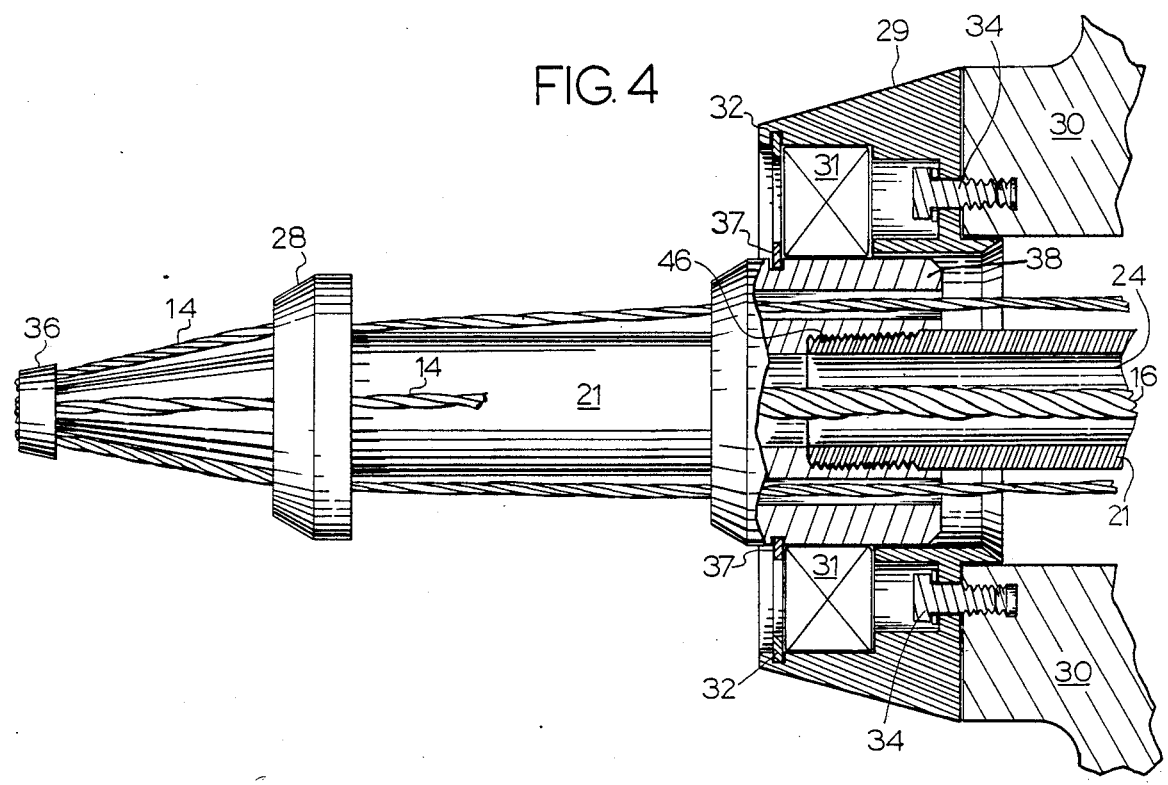
FIG. 4 is a side elevation and partial cut away view of the other terminal portion of the terminal portion of the elongated accumulator 21 FIG. 1, including a stop means.
Figure 5:
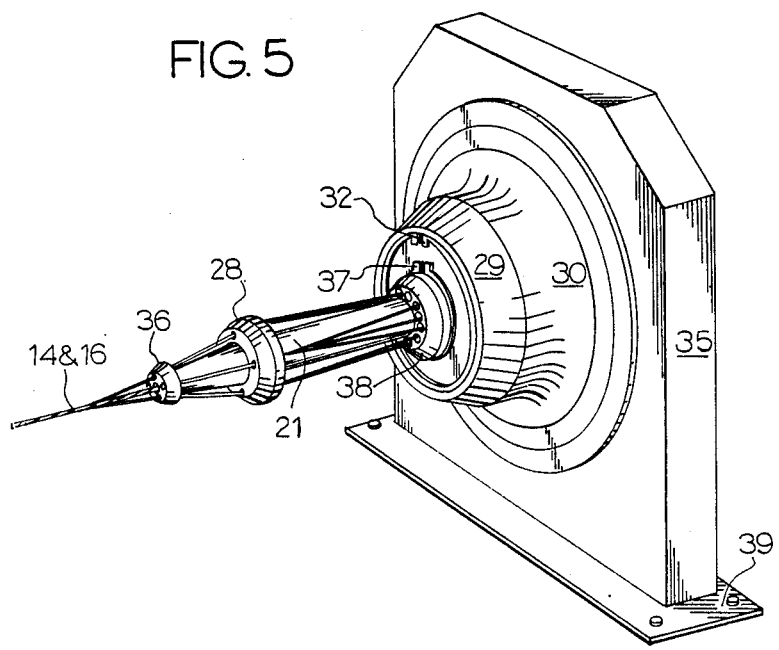
FIG. 5 is a perspective view of the apparatus of FIG. 4 showing finished S-Z stranded coated optical fibers and/or buffer tubes emerging from the apparatus.

A major portion of the apparatus used to practice the invention is shown as element 1 in FIG. 1. The main working part of the apparatus shown in FIG. 1 is elongated accumulator 21, one terminal end portion of which is rotatably journaled in the apparatus shown in detail in FIGS. 2 and 3 and shown generally in the upper right-hand terminal portion of FIG. 1. Elongated accumulator 21 has another terminal end portion, which is rotatably journaled in the apparatus shown in FIGS. 4 and 5. The apparatus shown in FIGS. 4 and 5 is disposed in the lower left of FIG. 1 (not shown). The flow of cable strength member 16 and coated optical fibers and/or buffer tubes 14 in which optical fibers are disposed is from the upper right-hand portion of FIG. 1 to the lower left-hand portion of FIG. 1. Central member(s) 16 is/are channeled inside of elongated accumulator 21 and coated optical fibers and/or buffer tubes 14 are disposed on the surface of elongated accumulator 21 and are S-Z stranded thereon by means of a reversing device ultimately forming product 14 and 16 shown in FIG. 5.

Element 2 is an upstanding frame member onto which a base 4 is affixed. Base 4 forms a channel in which an assembly made up of elements 8, 9, 10, 11, 12 and 13 are slideably disposed. Element 8 is a bottom member to which upstanding support members 9 are affixed. End members 10 and 13 are spaced apart from one another, each has an aperture in it in which elongated accumulator is received. End member 10 is affixed to support members 9 and 8 and side walls 12 and 41. End member 13 is affixed to bottom 8 and sidewalls 12 and 41. Element 11 is a hinged lid which may be rotated about hinge 40 to expose the interior of a box-like container made up of end members 10 and 13, side members 12, 41, lid 11 and bottom 8.

Affixed to upstanding member 42 is an axle 18 terminated by nut 43. Gear member 17, having teeth members 44, is rotatably affixed to axle 18, which in turn is affixed to a power means (not shown) to rotate gear 17. Belt 19 with teeth 45 are engaged with gear 17 and further engaged over pulley 20 which is affixed to elongated accumulator 21. By reversibly rotating gear 17, belt 19 is rotated first in one direction and then in another direction referred to herein and in the prior art as a reversing direction. Such rotation causes pulley 20 and elongated accumulator to do likewise and thus causes coated optical fibers and/or buffer tubes 14, as they are engaged on the surface of elongated accumulator 21, to be twisted first in one direction and then in another direction, thus forming the desired S-Z stranding.

Note should be made of cylinders 5, which may be air or liquid driven, which include pistons 6 affixed to cross member 7. Cross member 7 is affixed to base 8 and by operating the cylinders 5 in a well-known manner, the apparatus composite composed of elements 8, 9, 10, 11, 12, 13, and 41 can be moved to the upper right, or to the lower left portion of FIG. 1 as shown by the double headed arrows and dotted lines. This movement will cause tensile forces to be applied to accumulator 21 or the tensile forces relieved when maintenance or threading of the apparatus is desired, as the case may be. Such application of tensile forces will be more fully explained later.

Figure 2:
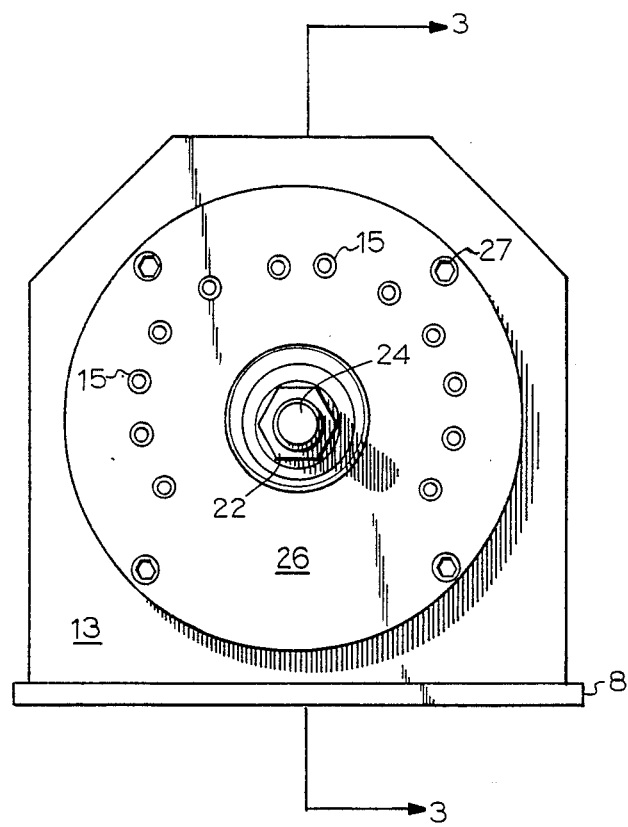
FIG. 2 is a front elevation view of an end plate assembly (including a stop means) used to place tension on the elongated accumulator of FIG. 1.

Turning now to FIG. 2, there is shown in this Figure that portion of the apparatus of element 1 of FIG. 1 that comprises a terminal end portion of the apparatus, namely the apparatus shown in the upper right-hand corner of FIG. 1. Element 26 is a plate affixed to end member 13. In plate 26 there are a plurality of apertures 15 through which coated optical fibers and/or buffer tubes 14 may be threaded. Central member(s) 16 is/are disposed in cavity 24 of elongated accumulator 21 as shown in FIGS. 2, 3, and 4.

Figure 3:
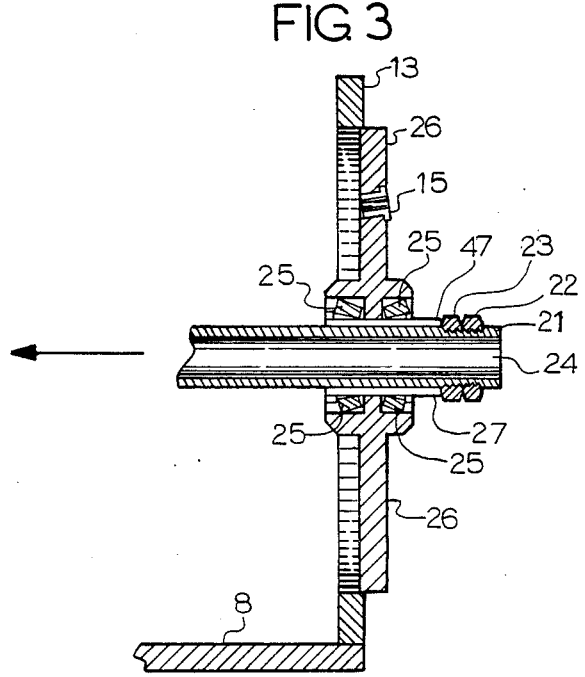
FIG. 3 is a cross-sectional view of the end plate assembly of FIG. 2 along lines 3—3.

Referring now to FIG. 3, which is a cross section along lines 3—3 of FIG. 2, the reader will recognize end member 13 in plate 26, as well as apertures 15. Elements 25 are bearing members. Element 27 is a sleeve-like member affixed to the outermost surface of elongated accumulator 21 forming a shoulder 47. Elements 22 and 23 are nuts which may be threadably engaged to elongated accumulator 21, forming a stop means in combination with sleeve member 27 and shoulder 47. This combination allows tension to be applied to elongated accumulator 21 by applying a force to elongated member 21 in a direction shown by the arrow in FIG. 3. Obviously, this force arises out of movement of pistons 6 by cylinders 5 shown in FIG. 1.

The apparatus combination shown in FIG. 4 forms the terminal portion of elongated accumulator of FIG. 1 on the downstream side of the flow of coated optical fibers and/or buffer tubes 14 and central member(s) 16 as they are S-Z stranded. More simply stated, the terminal portion of elongated accumulator 21, shown by FIGS. 4 and 5, appear at the lower left-hand corner of element 1 of FIG. 1, not shown in FIG. 1. Elements 36 and 28 contain apertures which act as guide members. The S-Z stranded coated optical fibers and/or buffer tubes 14 are threaded through these apertures and ultimately come in contact, in their final S-Z stranded configuration, with central member(s) 16 as it emerges from elongated accumulator 21 in the left-hand portion of accumulator 21 of FIGS. 4 and 5. Element 30 is a first face plate which is affixed to upstanding member 35. Upstanding member 35 is further affixed to base 39, affixed (not shown) to element 4. Second face member 29 is affixed to first face plate 30 by means of bolts 34. Second face plate 29 has a cavity therein in which sealed bearings 31 are disposed. Second face plate member 29 also has other cavities therein in which snap rings 32 and 37 may be engaged so as to secure bearings 31 in place and to form a mechanical connection between face plate 29 and outer sleeve 38, which circumscribes elongated accumulator 21. Sleeve 38 is threadably engaged to accumulator 21 by means of threads 46. Thus, any force applied to base 8 or plate 13 through sleeve 27, shoulder 47 and nuts 22 and 23 place a tension on elongated accumulator 21. Of course, a reverse force would relieve such tension as indicated by double headed arrows and dotted lines in FIG. 1. In the embodiment shown in FIGS. 1, 2, 3, 4, and 5, the apparatus composite of FIGS. 4 and 5 are fixed, whereas the apparatus assembly of FIGS. 2 and 3 are movable in the directions shown by the double-headed arrows of FIG. 1. Thus, it is readily apparent how the cylinders 5 and pistons 6 of FIG. 1 apply a tension or remove such tension on elongated accumulator 21.

Employing the apparatus shown in FIGS. 1, 2, 3, 4 and 5, certain experiments were run with respect to the revolutions per minute of the accumulator versus amplitude (measured in inches) for various tensions measured in pounds applied to elongated accumulator 21. The results of these experiments are shown in FIG. 6 with the X axis representing amplitude, peak to peak, of the elongated accumulator as it is being rotated at various revolutions per minute as shown by the Y axis. Anything greater than an amplitude of 1.1 at a given rpm is deemed to be unacceptable and anything below an amplitude of 1.1 is deemed to be acceptable. The reader will note that there are five plots denoted 124, 248, 372, 496 and 590, such plots representing the amount of tensile force in pounds applied to accumulator 21. It will be noted that a minimum of tensile force of 124 pounds is found to be essential. Obviously, the amount of the upper limit of tensile force would be a tensile force that would be less than that of the elastic limit of the material out of which the elongated accumulator was made. The amplitude data disclosed by FIG. 6 is peak to peak and includes the outside diameter (O.D.) of elongated accumulator 21. To calculate actual elongated accumulator, this O.D. of 0.875" must be subtracted.

The apparatus is operated as follows. Elongated coated optical fibers and/or buffer tubes 14, threaded through apertures 15, are traversed from upper right to lower left as shown in FIG. 1. Simultaneously, central members(s) 16 are traversed through the inner portion of accumulator 21, namely, through cavity 24. Through the reversing means as shown in FIG. 1, elongated accumulator 21 is rotated first in one direction and then second in another direction. When coated optical fibers and/or buffer tubes 14 with optical fibers disposed therein, engage the outer surface of elongated accumulator 21, they are subject to the reversing forces that are applied to the elongated accumulator 21, thus resulting in S-Z stranding. Simultaneous with the S-Z stranding, cylinders 5 and pistons 6 are activated so that at least 124 pounds of tensile force is placed upon elongated accumulator 21, such force obviously being applied in the direction upstream, that is towards the upper right-hand portion of FIG. 1. It is to be further understood that element 38, although rotatably engaged to elongated accumulator 21 is rotatably engaged with second face member 29 as shown by FIG. 4. A tensile force between 124 and 590 pounds has been found to be acceptable; however, the upper limit may be a force that does not exceed the elastic limit of the material from which the elongated accumulator is made.

What is claimed is:

1. An S-Z stranding device comprising:
   (a) a first plate having an aperture therein;
   (b) a second plate, having an aperture therein, spaced apart from said first plate;
   (c) an elongated accumulator having first and second terminal end portions and first and second free edges, said first terminal end portion received in the aperture of said first plate and said second terminal end portion received in the aperture of said second plate;
   (d) a reversing device engaged with the elongated accumulator for rotating the elongated accumulator first in one direction and then second in another direction;
   (e) first stop means affixed to said elongated accumulator between said first plate and the free edge of said first terminal portion of said elongated accumulator;
   (f) second stop means affixed to said elongated accumulator between said second plate and the free edge of said second terminal end portion; and,
   (g) a device connected to said elongated accumulator for placing a tensile force on said elongated accumulator, said tensile force being not less than 124 pounds.

2. The S-Z stranding device of claim 1 wherein said tensile force is between 124 and 590 pounds.

3. The S-Z stranding device of claim 1 wherein said tensile force is less than the elastic limit of the material from which the elongated accumulator is made.

4. The S-Z stranding device of claim 1 further including a first housing in which said first plate is received and a second housing in which said second plate is received.

5. A method of S-Z stranding comprising:
   (a) providing an elongated accumulator having a longitudinal axis;
   (b) disposing a plurality of elongated strands on said elongated accumulator to be S-Z stranded; and,
   (c) rotating the elongated accumulator and the elongated strands about the longitudinal axis of the elongated accumulator first in one direction and second in another direction while simultaneously applying a tensile force to said elongated accumulator of not less than 124 pounds.

6. The method of claim 6 wherein said tensile force is between 124 and 590 pounds.

7. The method of claim 6 wherein said tensile force is at least 124 pounds, but less than the elastic limit of the material from which the elongated accumulator is made.

* * * * *